United States Patent [19]

Hunka

[11] 4,114,034
[45] Sep. 12, 1978

[54] OPTICAL CURSOR TRACKING CORRECTION SYSTEM

[75] Inventor: George William Hunka, Bellmawr, N.J.

[73] Assignee: RCA Corporation, New York, N.Y.

[21] Appl. No.: 782,754

[22] Filed: Mar. 30, 1977

[51] Int. Cl.² ............................................. G05B 1/00
[52] U.S. Cl. .................................... 250/202; 318/577
[58] Field of Search ................ 318/577; 250/202, 208, 250/209, 578

[56] References Cited

U.S. PATENT DOCUMENTS

| 3,135,904 | 6/1964 | Purkhiser | 250/202 |
| 3,502,880 | 3/1970 | Martinek et al. | 250/202 |
| 3,670,153 | 6/1972 | Rempert et al. | 250/202 |
| 3,774,098 | 11/1973 | Moss | 318/577 |

Primary Examiner—David C. Nelms
Attorney, Agent, or Firm—H. Christoffersen; Samuel Cohen; Carl M. Wright

[57] ABSTRACT

Linear photosensitive array rotatably mounted in a digitizing cursor and maintained in an orthogonal relationship with the function (such as a curve or the like) to be digitized. As the cursor is moved along the function, the photosensitive array is maintained at right angles to the direction of the cursor movement. Circuits are provided to sense any difference in position between an indicium in the cursor and the function being traced, to obtain correction values to be applied to the digitized coordinates of the cursor position.

8 Claims, 9 Drawing Figures

OPTICAL CURSOR TRACKING CORRECTION SYSTEM

The invention herein described was made in the course of or under a contract or a subcontract thereunder, with the Department of the Air Force. The U.S. Government has rights in the invention pursuant to Contract No. F30602-74-c-0318, awarded by the Department of the Air force.

This invention relates to automatic tracking error correction in digitizers.

Digitizers, such as light table digitizers, are widely used in such fields as the computer control of manufacturing processes, computer-aided design, and the like. A digitizer is a type of special purpose analog-to-digital converter that converts picture, map, sketch, or other graphic information into digitized information for processing by a computer. It includes an indicator which is movable over the function to be digitized and means for periodically translating the X and Y positions of the indicator into digital signals. This is the reverse of the plotting operation where X and Y position signals are supplied to the plotter for actuating a recording device, such as a pen or light beam, as it travels over a recording medium such as a sheet of paper or unexposed film.

Digitizing tables may include a background light behind the medium (paper, film or the like) on which an analog function (such as a graph or the like) is recorded, and a cursor which is movable (generally by hand) over the front surface of the medium. The cursor includes indicia, such as cross-hairs or concentric circles to aid in accurately positioning the indicator over the function to be digitized. Transducers beneath or imbedded in the table top may be used to sense the motion of the cursor by magnetic or other means. Alternatively, the graphic medium can be illuminated in a reflective mode, i.e., by a source of light in the cursor.

An example of a low-cost graphic digitizer is the Model E241 (ELOGRAPHICS, Inc.). The cursor in this digitizer is a pen-like instrument which is used to trace over the function to be digitized. A large system, providing more sophisticated encoding, is the GRADICON digitizing table which uses a cursor comprising a housing having a reticle to aid in accurate positioning. As the cursor is traced over the function to be digitized, processing circuits convert the position of the cursor into X and Y coordinate values either in response to the depression of a button or to pre-programmed periodically recurring pulses. As the operator moves the cursor, it is difficult to position it exactly over the function to be digitized;, therefore, the X and Y coordinates contain errors. If greater care is exercised, the errors can be reduced but at the expense of the additional time.

A system embodying the invention provides means for automatically correcting errors as the cursor is moved if the cursor is maintained within a predetermined range of the function to be digitized. The system includes sensing means for supplying error signals indicative of the difference in positions between particular locations along the function to be digitized and a reference point in the cursor. It also includes processing means responsive to the error signals and to coordinate signals for producing corrected coordinate signals.

A cursor for use in the system according to the invention can be constructed by modifying a state-of-the-art cursor. For example, in FIG. 1, the shaded portion 10 represents the body of a cursor such as used in the GRADICON system. An optical system is added to the cursor and includes a support 11, shown cross hatched, a beam splitter 12, and a lens system 14 which projects the image from a viewing aperture 15 onto a photosensitive array 16. The photosensitive array 16 is rotatably mounted in a frame 17 which is driven by a motor 18. A feedback transducer 19, such as a potentiometer is driven indirectly or directly by the motor shaft to provide signals indicating the angular position of the photosensitive array 16 for servo control as described in more detail below.

Figure 1:
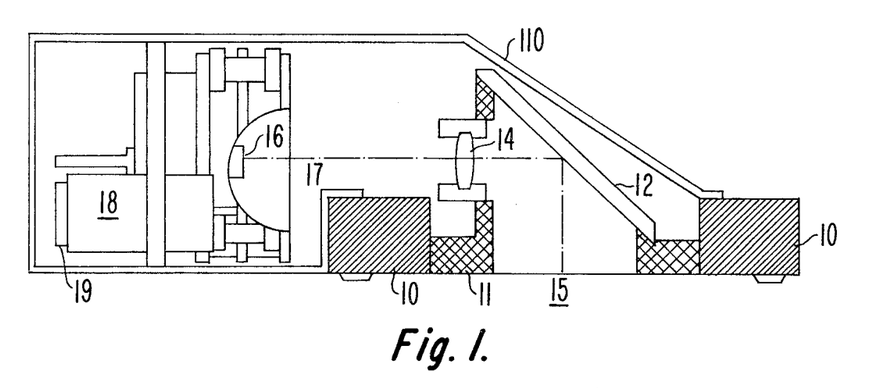
FIG. 1 is a cross-sectional view of a modified digitizing cursor.

In the embodiment being described, the photosensitive array 16 is a linear array of photosensitive diodes and can be implemented using an RL-64 linear photodiode integrated circuit device (Reticon, Inc.), which is commercially available and contains 64 silicon diodes linearly arranged on 0.002 inch (5.08 × $10^{-3}$ cm.) centers. It can be scanned at rates from 1 KHz to 10 MHz.

The modified cursor of FIG. 1 can utilize a reticle having position indicia such as a center dot, which will not interfere with the operation of the array in the viewing aperture 15. The dot is centered in a circle and may be viewed by an operator through a hole or opening in the housing 110 of the modified cursor. The lens system 14 is designed so that if the function to be digitized is viewable within the circle in the viewing aperture 15, it is projected onto the photosensitive array 16 at a point to be determined by the circuitry of the invention as described below in more detail.

Figure 2:
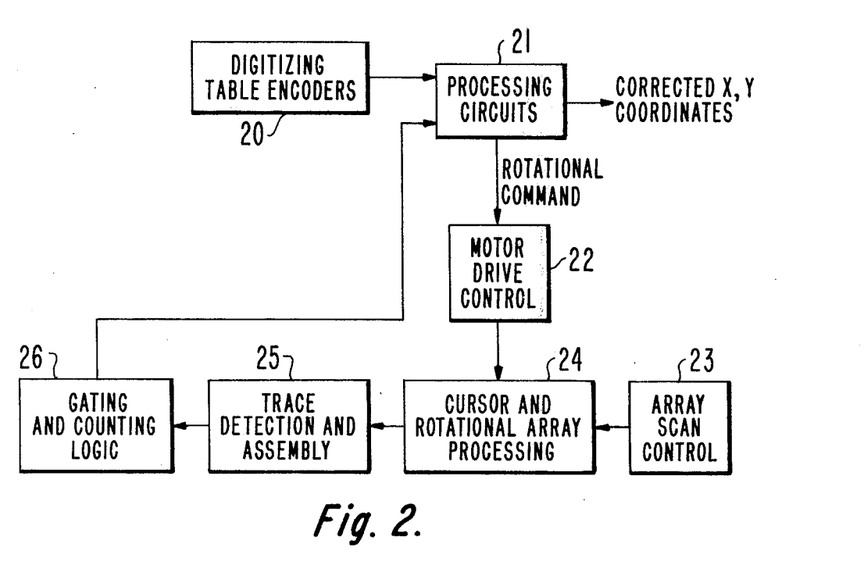
FIG. 2 is a block diagram of a system embodying the invention.

A system embodying the invention is shown in FIG. 2. The digitizing table encoders 20 provide signals to a processing circuit 21 indicating the position of the cursor as it is moved over the top of the digitizing table. By a process to be described in more detail below, the processing circuits 21 provide a rotational command to the motor drive control 22 which rotates the photosensitive array as functions are traced. An optimal arrangement is to maintain the linear axis of the photosensitive array at right angles to the function to be digitized. Provisions are made for rotational angles greater than ±2π so that closed contours can be digitized. The right angle relationship provides better sensitivity and accuracy in the tracing of curved functions. The photosensitive array is repetitively scanned by the array scan control circuits 23 that supply timing signals to the photodiode circuit of the photosensitive array in the cursor 24. The output signals from the diode array are processed by detection circuits 25 and converted to correctional signals by gating and counting logic circuits 26. The output signals from the logic circuits 26 are coupled to the processing circuits 21 to correct the X and Y coordinate values of the cursor position determined by the processing circuits 21 using the signals from the encoders 20. By using a cursor and processing circuits according to the invention, an operator need only keep the function to be digitized within the circle in the viewing aperture of the cursor in order to maintain an accurate coordinate conversion, the error correction being provided by the system according to the invention.

Figure 3:
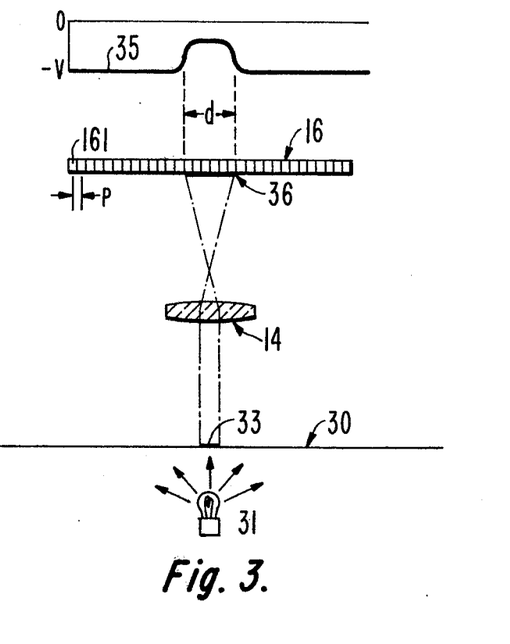
FIG. 3 is a cross-sectional representation of a photooptical imaging system.

FIG. 3 illustrates the photo-imaging system. The graphic device 30 is illuminated by a light source 31. A cross-section of the function to be digitized 33 is projected on the array 16 by the lens system 14. The image plane 36 projected onto the diode array 16 covers several elements of the photosensitive array 16. The elements or diodes in the array are separated from adjoining elements by a distance called the pitch. The elements are scanned from left to right starting with the reference element 161 and produce an output signal represented by the voltage graph 35 corresponding to the envelope of output voltages from the diode elements. The dimension $d$, i.e., the width of the image plane 36 on the diode array 16 is divided in half by means to be described in more detail below to determine the exact center of the function to be digitized 33 with respect to the center of the cursor. In this illustration, it is seen that by magnifying the function to be digitized, the center can be more accurately determined.

Figure 4:
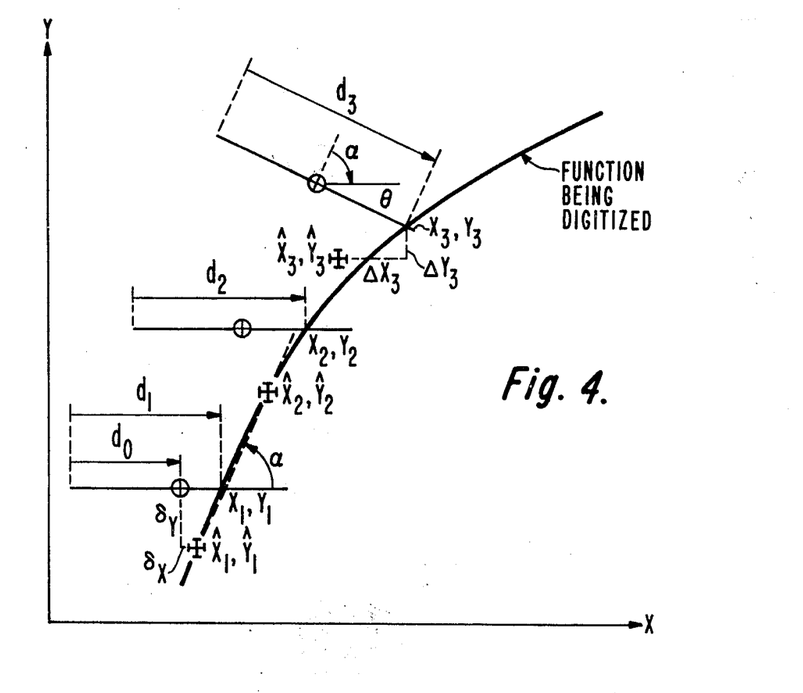
FIG. 4 is a cartesian graph showing the geometrical relationships used in the description of the invention.

In FIG. 4, the geometric relationships of the array with respect to the function being digitized are illustrated. (For clarity, the distances between the sample points shown have been exaggerated. Consequently, significant differences in slopes between the points indicate angular displacement from perpendicularity to the function. In the actual practice, where sample dimensions are closely spaced, these errors are reduced to second order magnitudes in thier effect on correctional terms.) The center of the cursor is indicated by the Maltese cross symbol. The digitizing table encoder outputs are designated $\hat{X}$ and $\hat{Y}$ and represent the coordinate values of the cursor center at the selected points $(\hat{X}_1, \hat{Y}_1)$, $(\hat{X}_2, \hat{Y}_2)$ and $(\hat{X}_3, \hat{Y}_3)$. The array element about which the array rotates, i.e., the rotational axis, is shown by the symbol ⊕. Constant off-set errors with respect to the coordinate axes are assumed to exist between the cursor center and the array rotational axis. They are designated by $\delta x$ and $\delta y$. These dimensions are exaggerated in FIG. 4 to maintain diagrammatic clarity.

Two procedures can be used to determine the offset distances which exist between the cursor center and the array rotational center. The first procedure involves optical - mechanical alignment by viewing the projected array rotational center on the cross-hair.

Figure 5:
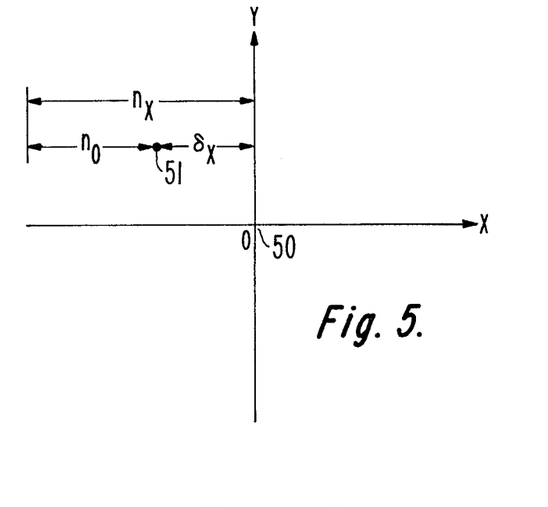
FIG. 5 is a cartesian graph showing the relationships used in determining the X off-set error.
Figure 6:
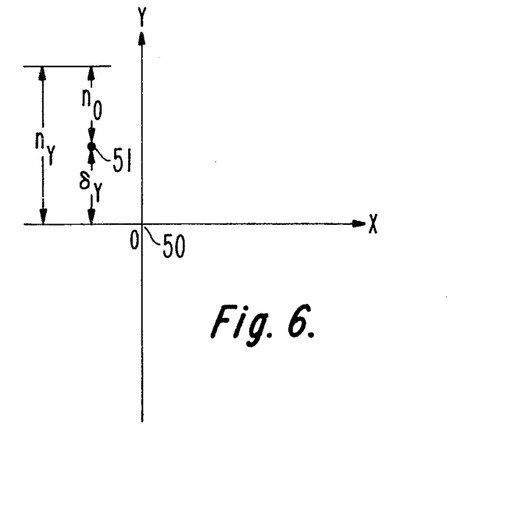
FIG. 6 is a cartesian graph showing the relationships used in determining the Y off-set error.

In the second procedure, the off-set errors can be determined by providing a zero degree, as shown in FIG. 5, and a 90°, as shown in FIG. 6, reference position for the array in conjunction with reference X-Y coordinates as demonstrated in FIGS. 5 and 6. These errors are designated as $\delta x$ and $\delta y$. The centers may be aligned by fine motions of the cursor housing until the array output counts in both coordinate axes equal the count to the array center for mechanical alignment, or the off-set values can be accounted for during calculations by using the off-set values as is the case in the described embodiment.

Returning to FIG. 4, the distance from the reference array element, at which the scan starts, to the rotational axis is designated as $d_0$; the distances to the detected element, i.e., the element at the center of the projected image, are designated as $d_1$, $d_2$ and $d_3$. These distances are given by, using the general case, $$d_i = p\, n_i$$

where $p$ = array element pitch distance, and
$n_i$ = number of array sample pulses counted from the array reference element to the detected element.

The first two cursor samples designated $(\hat{X}_1, \hat{Y}_1)$ and $(\hat{X}_2, \hat{Y}_2)$ are shown as accurately tracking the function to allow computation of the initial array orientation. The third cursor position represented by $(\hat{X}_3, \hat{Y}_3)$ shows how correction terms are derived as the cursor deviates in position from the traced function.

From FIG. 4, the X and Y coordinates of the intercept of the array with the function to be digitized can be determined by $$X_i = \hat{X}_i + \Delta X_i$$

and $$Y_i = \hat{Y}_i + \Delta Y_i.$$

The values of $\Delta X_i$ and $\Delta Y_i$ can be determined from $$\Delta X_i = (d_i - d_0) \cos \theta - \delta_x$$

and $$\Delta Y_i = \delta_y - (d_i - d_0) \sin \theta.$$

The value of $d_0$ is known because it is the distance from the reference diode in the array to the axis of rotation of the array. The offsets $\delta_x$ and $\delta_y$ are predetermined as previously described. The value of $\theta$ is given by $$\theta = \alpha - \pi/2$$

where $\theta$ is the angle through which the array is rotated to remain orthogonal to the function to be digitized. The angle $\alpha$ is calculated from the encoded $\hat{X}$ and $\hat{Y}$ coordinates by $$\alpha = \arctan (\hat{Y}_i - \hat{Y}_{i-1}/\hat{X}_i - \hat{X}_{i-1})$$

That is, as each $\hat{X}$ and $\hat{Y}$ coordinate pair are calculated, the previous corresponding values are subtracted therefrom, the Y difference is divided by the X difference, and the quotient is used as an argument to find the arctangent, i.e., the angle whose tangent has the value of the quotient.

Each new value of $\theta$ is compared to the present value of $\theta$ as supplied by the feedback transducer 19 (potentiometer) driven by motor 18 to generate a voltage to the motor 18 in the cursor that will rotate the array to the new value of $\theta$.

The values of $d_0$, $D_i$, $\delta_x$ and $\delta_y$ are in the form of counts, each count representing a unit equal to the pitch of the photodiodes in the array, the pitch being defined as the distance between centers of adjacent diode cells.

The value of $d_0$ is known from the mechanical mounting of the diode array 16 in the rotatable mounting 17 as shown in FIG. 1. In FIG. 5, the X offset, $\delta_x$, is determined by placing the cursor at the center 50 of an X-Y reference graph and determining the count $n_x$ from the output of the diode array by counting from the reference diode (161, FIG. 3). The number of diode cells or counts, $n_0$, from the reference diode to the rotational center 51 is subtracted from $n_x$ to give $\delta_x$, the X offset, as a binary number.

As shown in FIG. 6, the Y offset, $\delta_y$, is found in a similar way by rotating the array 90° to the reference axis and placing the cursor over the center of the reverence coordinate axes. The count $n_0$ is subtracted from the count $n_y$ obtained between the reference diode and the intersection of the diode array with the X axis. The difference is the Y offset value $\delta_y$. This is also a count representing a binary number.

As previously described in conjunction with FIG. 3, the function to be digitized 33, when projected by the lens system 14 onto the image plane 36, subtends several of the diodes in the diode array 16. To obtain the distance from the reference diode to the center of the function to be digitized, it is necessary to determine the center diode of the group of diodes spanned by the image in the image plane 36. The count from the reference element 161 to the center of the image as projected on the array 16 is the value $d_i$.

One way of locating the center of the area is to institute a count at the reference element and count each element up to the leading edge of the image on the array and then count every other element until the trailing edge of the image is detected. The total count will thereby be the number of cells from the reference element to the center of the image. Such a system is described in more detail in U.S. Pat. No. 3,249,692, to B. R. Clay et al., assigned to the same assignee as this application.

Figure 7:
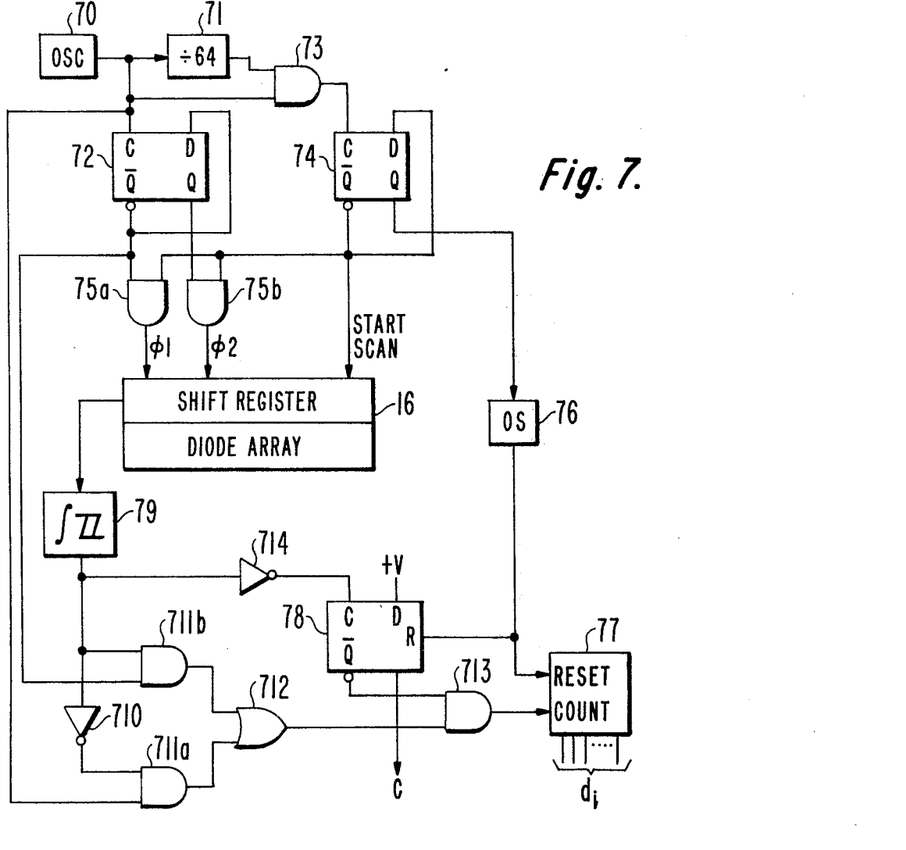
FIG. 7 is a logic diagram of a counter circuit useful in implementing the invention.
Figure 8:
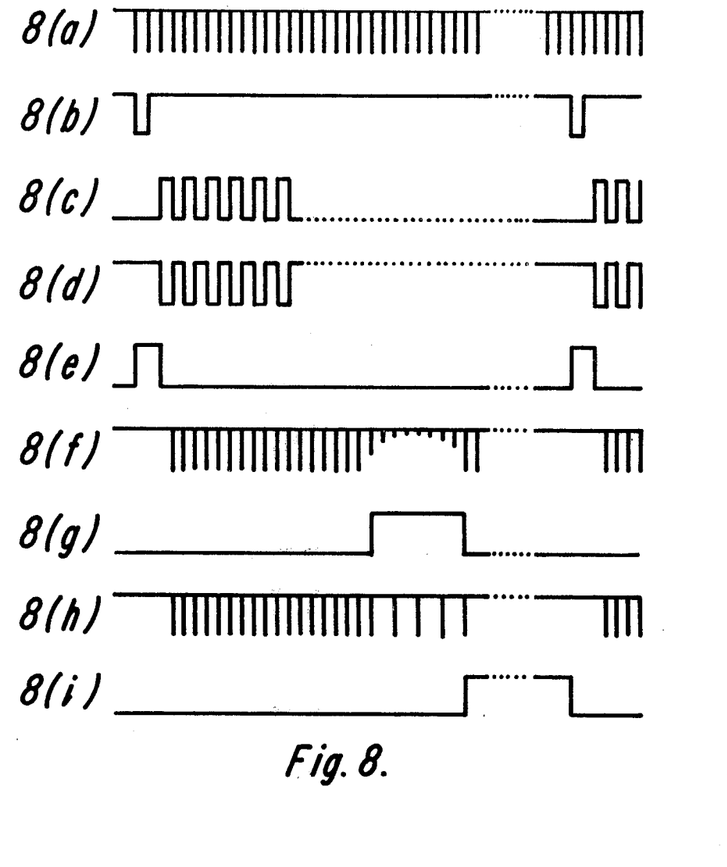
FIG. 8 is a timing diagram illustrating idealized waveforms at various points in the circuit of FIG. 7.

A logic diagram of a circuit suitable for producing the value of $d_i$ as described is shown in FIG. 7. Associated waveforms are illustrated in FIG. 8. An oscillator 70 provides the basic timing pulses; the output signal from the oscillator 70 is represented by the waveform in FIG. 8(a).

The oscillator 70 drives a divide-by-64 counter 71 which produces an output signal when all of the stages in the counter 71 are reset, i.e., the counter 71 contains a zero detector (not shown) that produces an output signal. The output signal from the oscillator 70 also drives a D-type flip-flop 72 which is feedback-coupled to operate as a divide-by-two toggle stage. The output signals from the oscillator 70 and the counter 71 are combined in an AND gate 73 which toggles a second D-type flip-flop 74 to produce the START SCAN pulse which is shown in FIG. 8(b). The flip-flop 74 is feedback-coupled to toggle so that it produces an output signal over one period of the oscillator 70 during the period that the divider 71 provides a zero output signal. When the flip-flop 74 is set, the reset output signal provides the logical zero START SCAN pulse, shown in FIG. 8(b), to a shift register included in the diode array 16, as in the Reticon RL-64 device. While in the set state, the flip-flop 74 reset output signal inhibits the operation of two AND gates 75a and 75b. When the flip-flop 74 is reset, the set and reset output signals from the flip-flop 72 are gated via the AND gates 75a and 75b to the shift register in the diode array 16 as the two-phase clock signals required for the operation of the device. The two-phase output signals from the AND gates 75a and 75b are shown in FIGS. 8 (c) and 8(d).

The set output signal from the flip-flop 74 activates a one-shot multivibrator 76 which provides an output signal that holds a counter 77 reset and resets a D-type flip-flop 78.

The output signal from the shift register in the diode array 16 is applied to a low order hold device containing a thresholding circuit 79. Such a device can be implemented using a low-pass filter or integrator having a time constant much greater than the period of the oscillator and followed by a Schmitt trigger. It will be referred to herein as an integrator-threshold device. The output signal from the integrator-threshold device 79 is maintained at a logical zero while negative-going input pulses are continuously applied at the clock rate. The shift register output signals are shown in FIG. 8(f) and the output signal from the integrator-threshold device 79 is shown in FIG. 8(g). While in the logical zero state, the output signal from the integrator-threshold device 79 is inverted by inverter 710 to a logical one to enable an AND gate 711a which passes the clock signals from the oscillator 70 via an OR gate 712, and an AND gate 713 to the input terminal of the counter 77. The AND gate 713 is enabled by the reset output signal from the flip-flop 78.

When the output signal from the integrator-threshold device 79 changes to a logical one at the leading edge of the image, and AND gate 711b is activated and the AND gate 711a is inactivated by the resulting logical zero signal from the inverter 710. The AND gate 711b passes the output signal from the divide-by-two flip-flop 72 to the OR gate 712 via the AND gate 713 to the counter 77. When the output signal from the integrator-threshold device 79 returns to a logical zero, a positive-going signal is produced at the output terminal of the inverter 714 which clocks the flip-flop 78 to the set condition inhibiting the operation of the AND gate 713 so that no further counts increment the counter 77. The control signal C is also produced to indicate that the count value, which represents $d_i$, is valid. The output signal C is shown in FIG. 8(i). The count input signals from the output terminal of the AND gate 713 are shown in FIG. 8(h). By reducing the count value by a factor of two between the edges of the image, the result in the counter 77 represents the number of cells from the reference cell to the center of the image.

Figure 9:
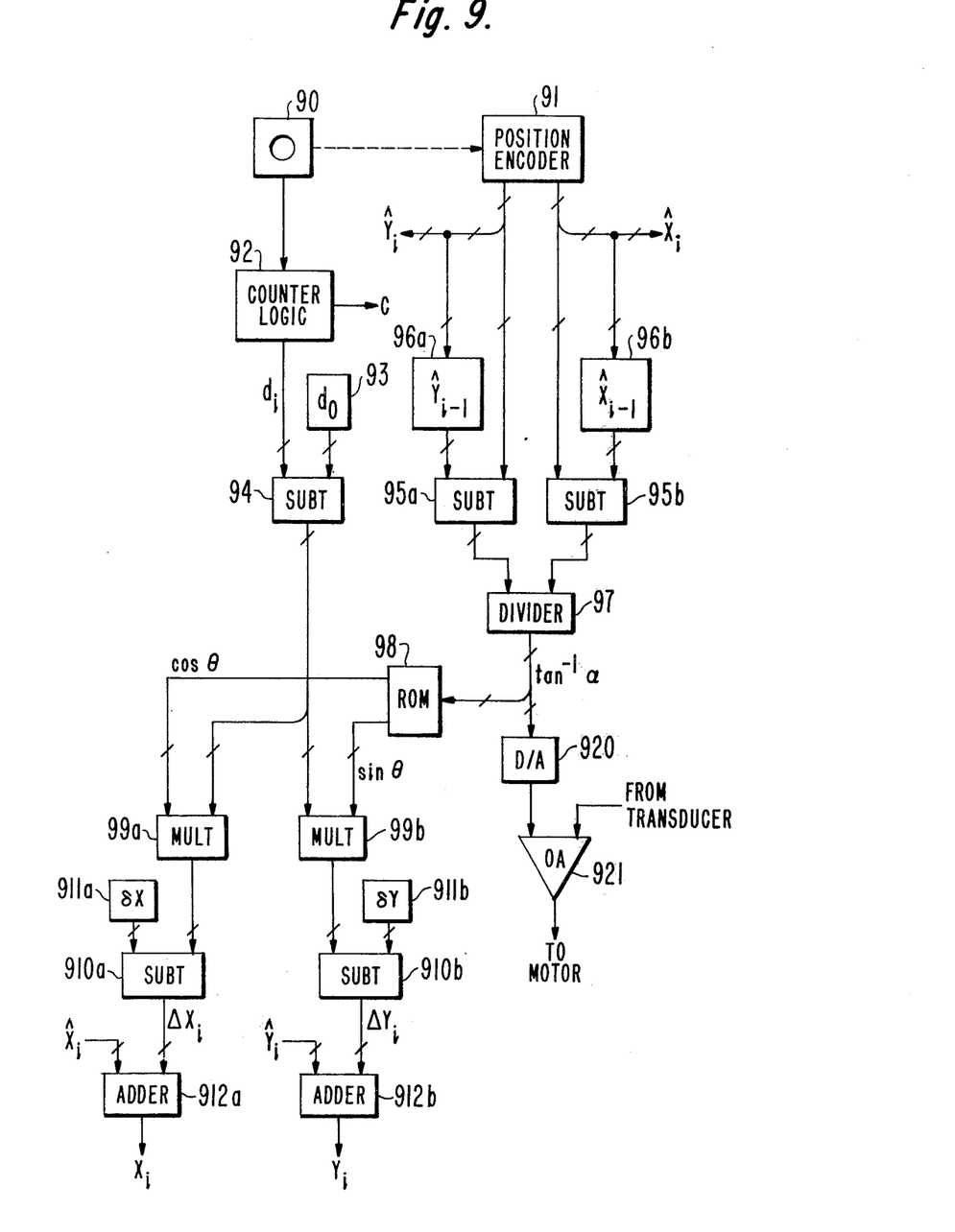
FIG. 9 is a logic diagram of a system embodying the invention.

A system embodying the invention is shown in FIG. 9. A cursor 90 operates with a position encoder 91 in the usual way as known in the prior art. The cursor 90 is coupled electrically to counter logic 92 which was explained in detail and shown in FIG. 7. The output signal of interest from the counter logic 92 is the binary value $d_i$, which is applied to a subtractor 94, the other input of which is a register 93 which contains the predetermined binary value of $d_0$.

The output signals from the position encoder 91 represent $\hat{X}_i$ and $\hat{Y}_i$, estimates of $X_i$ and $Y_i$. These signals are applied to subtractors 95b and 95a, respectively. The START of SCAN signal shown in FIG.7 can be used to store the values of $Y_i$ and $X_i$ in registers 96a and 96b, respectively, so that during a computational cycle, the registers 96a and 96b contain the previous values of the estimates of the Y and X coordinates, respectively. Therefore, the output signal from the subtractors 95a and 95b represent the difference between the previous estimate of the coordinates and the present estimate. In other words, the differences represent the vertical and horizontal vectors of the cursor movement between samples. The differences from the subtractors 95a and 95b are applied to a divider 97 so that the difference in the $\hat{Y}$ values are divided by the difference in the $\hat{X}$ values to produce an output which is proportional to the inverse tangent of $\alpha$.

The output signals from the divider 97 are applied as address signals to a Read Only Memory (ROM) 98. Instead of reading out the angle from the ROM 98, the output signals are calibrated to be the cosine and sine value of $\theta$. The construction of such ROMs are well known in the art and need not be explained in detail for an understanding of the invention.

Each of the sine and cosine values are multiplied by the difference signals from the subtractor 94, which represent the value $(d_i - d_0)$, in multipliers 99a and 99b. The output signals from the multipliers 99a are applied to a subtractor 910a, the other input to which is the X offset value $\delta_x$, which is stored in a register 911a, and subtracted from the output value from the multiplier 99a. Similarly, the Y offset value is stored in a register 911b and is applied to a subtractor 910b to which the output signals from the multiplier 99b are applied. The output signals from the subtractors 910a and 910b are $\Delta X_i$ and $\Delta Y_i$, respectively. These are applied to the adders 912a and 912b to produce, respectively, the corrected values of the coordinates $X_i$ and $Y_i$.

The output signals from the divider 97 are also applied to a digital-to-analog converter 920 using suitable reference voltage to produce an output signal proportional to $\theta$. The resulting analog output signal representing a new $\theta$ value is applied to an input of an operational amplifier 921. The other input signal to the amplifier 921 is the output signal from the feedback transducer 19 (potentiometer) driven by the motor 18 in the cursor as shown in FIG. 1. The operational amplifier has feedback elements (not shown) that produce an output signal which is coupled to the motor in the cursor 90 to drive it in a direction to maintain the diode array in an orthogonal relationship with the function to be digitized. Such motor controls are well known in the art and need not be described in detail for an understanding of the invention.

Although explained in terms of a bottom-lit graphic device, the principles embodied in the invention are equally applicable to any type photosensitive cursor tracking.

The arithmetic devices used in the system of FIG. 9 are commercially available or can be constructed from commercially available devices. Adders and subtractors can be implemented using intergrated circuit devices SN74181 (Texas Instruments, Inc.) or similar devices.

Multiplying two digital (binary) numbers can be performed sequentially or combinatorially using cascaded logic networks. The sequential technique is well covered in the literature. (See, for examples, *Digital Computer and Control Engineering*, R. S. Ledley, McGraw-Hill Book Co., Inc., 1960, esp. Chaps. 15 and 16; and *The Logic of Computer Arithmetic*, I. Flores, Prentice-Hall, 1963, Chaps. 3, 8–11.)The use of combinatorial networks is also well known and, though usually requiring more hardware, produces the result after the propagation delays of the network gates. (See, for examples, "Multiplying Made Easy for Digital Assemblies" by C. Ghest, *Electronics*, Nov. 22, 1971, pp. 56–61; and "Parallel Multiplier Gets Boost from IC Iterative Logic" by J. Springer and P. Alfke, *Electronics*, Oct. 12, 1970, pp. 89–93.)

Digital (binary) division can be performed in a plurality of ways. In one technique, the divisor is repeatedly subtracted from the dividend, first aligning the divisor with the high order digits of the dividend and shifting the divisor one digit position to the right between subtractions. The quotient has a value of one each time the subtraction produces a positive or zero remainder. If the remainder is negative, the corresponding quotient bit is zero. In the latter case, the divisor may or may not be added back to the dividend. If it is, it is called restoring division; if it is not, it is called nonrestoring division. The apparatus for performing division is well documented in the art. (See, for examples, *Digital Computer and Control Engineering*, R. S. Ledley, McGraw-Hill Book Co., Inc., esp. Chaps. 15 and 16; and *The Logic of Computer Arithmetic*, I. Flores, Prentice-Hall, Inc., 1963, Chaps. 3, 12–14.) Another way of performing digital division is to multiply the divident by the reciprocal of the divisor. Properly arranged, the division process can be performed without timing circuitry, i.e., by combinatorial logic networks.

The reciprocal of a digital (binary) number can be calculated by a division process or by combinatorial logic networks. Both ways are well known in the art. The most straightforward way is the use of combinatorial logic because the result is available after the network gate propagation delays and external clocking is not required. For details of such a network, see, for example, "Designing a Binary Reciprocator" By J. R. Logan, *Computer Design*, May, 1973, pp. 109-115.

What is claimed is:

1. In a digitizing system including movable cursor means for tracing a function to be digitized, means responsive to said movable cursor means for supplying position signals representative of the position of the movable cursor means, and circuit means responsive to said position signals for generating coordinate signals corresponding to the position of said movable cursor means, the improvement comprising:
   sensing means mounted in said movable cursor means to sense the function to be digitized for supplying digital error signals proportional to a difference of position between the function to be digitized and reference point in said movable cursor means; and
   processing means responsive to digital error signals and said coordinate signals for producing corrected coordinate signals.

2. The invention as claimed in claim 1 wherein said sensing means comprises a linear photosensitive array means mounted in said movable cursor means and wherein said improvement further comprises turning means for rotating said sensing means to maintain a fixed angular relationship to the function to be digitized.

3. The invention as claimed in claim 2 wherein said linear photosensitive array means includes a plurality of linearly disposed photodiode means and output means coupled to said plurality of photodiode means for supplying sensing signals proportional to the light intensity on each of said plurality of photodiode means.

4. The invention as claimed in claim 3 wherein said turning means includes means responsive to successive coordinate signals for producing first angular signals representative of the slope of the function to be digitized, angle indicating means responsive to the sensing means for producing second angular signals indicative of the angle of said sensing means and drive means responsive to said first and second angular signals for rotating said sensing means.

5. The invention as claimed in claim 4 wherein said processing means includes means responsive to said sensing signals and to said first angular signals for supplying correction signals and means for applying the correction signals to said coordinate signals to produce the corrected coordinate signals.

6. In a system for translating the coordinates of a function being traced by a cursor means into successive digital quantities, in which the cursor means includes a fine indicium means which can be superimposed on the function and a coarse region which surrounds the indicium;

means responsive to the position of the indicium means for translating the same into first signals indicative of particular coordinates of the function;

means responsive to the displacement of the indicium means from the function while the latter is within the coarse region of the cursor means for producing second signals indicative of the displacements along said coordinates of said indicium means from said function; and     means responsive to said first and said second signals for producing digital quantities indicative of successive locations along said function as said cursor means moves along said function so long as said function is within said coarse region.

7. The invention as claimed in claim 6 wherein said means responsive to the displacement of the indicium means from the function includes a photosensitive array means for sensing the position of the function while the latter is within the coarse region of the cursor for producing said second signals.

8. The invention as claimed in claim 7 wherein said means responsive to the displacement of the indicium means from the function further includes means responsive to said first signals for positioning said array means in a fixed angular relation to the slope of the function.

* * * * *